(12) United States Patent
Pisetskiy et al.

(10) Patent No.: US 9,394,750 B2
(45) Date of Patent: Jul. 19, 2016

(54) COLLET COUPLING FOR ELECTRIC SUBMERSIBLE PUMP SHAFTS

(71) Applicant: SCHLUMBERGER TECHNOLOGY CORPORATION, Houston, TX (US)

(72) Inventors: Sergey Pisetskiy, Bartlesville, OK (US); Arthur I Watson, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 236 days.

(21) Appl. No.: 14/166,848

(22) Filed: Jan. 28, 2014

(65) Prior Publication Data

US 2014/0209323 A1 Jul. 31, 2014

Related U.S. Application Data

(60) Provisional application No. 61/757,904, filed on Jan. 29, 2013.

(51) Int. Cl.
*E21B 19/14* (2006.01)
*E21B 43/12* (2006.01)
*F16D 1/10* (2006.01)
*F16D 1/116* (2006.01)

(52) U.S. Cl.
CPC .............. *E21B 19/14* (2013.01); *E21B 43/128* (2013.01); *F16D 1/10* (2013.01); *F16D 1/116* (2013.01); *F16D 2001/103* (2013.01)

(58) Field of Classification Search
CPC ....... E21B 19/04; E21B 43/12; E21B 43/128; E21B 19/14; F04D 17/03; F04D 29/00; F04D 29/04; F04D 13/10; F04D 29/0405
See application file for complete search history.

(56) References Cited

U.S. PATENT DOCUMENTS

| | | |
|---|---|---|
| 502,686 A | 8/1893 | Tlton |
| 1,469,304 A | 10/1923 | Hughes |
| 3,260,541 A | 7/1966 | Sadler et al. |
| 3,468,169 A | 9/1969 | Welch |
| 3,588,154 A | 6/1971 | Voight |
| 3,832,076 A | 8/1974 | Gehrke |
| 4,606,671 A | 8/1986 | Rasmussen |
| 4,639,163 A | 1/1987 | Buthe et al. |
| 5,318,375 A | 6/1994 | Entrup et al. |

(Continued)

OTHER PUBLICATIONS

International search report and written opinion for the equivalent PCT patent application No. PCT/US2014/013616 issued on May 14, 2014.

*Primary Examiner* — Yong-Suk (Philip) Ro
(74) *Attorney, Agent, or Firm* — Michael Stonebrook

(57) ABSTRACT

A collet coupling for electric submersible pump shafts is provided. An example coupling for joining two shafts includes a tubular coupling member, and collet for fixing the coupling to a shaft via expandable fingers with ribs for latching into a groove on each shaft. Shoulders in the groove transmit axial load forces between the two shafts through the ribs, fingers, and collet. An example method includes attaching one end of the coupling to a shaft of an ESP unit already installed in a well, adjusting an axial reach of a threaded collet for attachment to a second shaft of an upper ESP unit, and engaging ribs of the collet into a groove of the second shaft to couple the two shafts. A sliding retainer allows quick release. An axial deviation distance may be factory-stamped on the ESP units for quick length adjustment and installation of collet couplings in the field.

25 Claims, 19 Drawing Sheets

(56) References Cited

U.S. PATENT DOCUMENTS

| | | |
|---|---|---|
| 5,688,067 A | 11/1997 | Straub |
| 6,868,912 B2 | 3/2005 | Proctor |
| 6,883,604 B2 | 4/2005 | Mack et al. |
| 7,325,601 B2 | 2/2008 | Mack et al. |
| 7,775,779 B2 | 8/2010 | Sheth et al. |
| 7,900,720 B2 | 3/2011 | Hall et al. |
| 2002/0179305 A1* | 12/2002 | Mack et al. ............. E21B 43/00 166/377 |
| 2007/0110593 A1 | 5/2007 | Sheth et al. |
| 2009/0291001 A1* | 11/2009 | Neuroth et al. ......... F04D 29/04 417/410.1 |

* cited by examiner

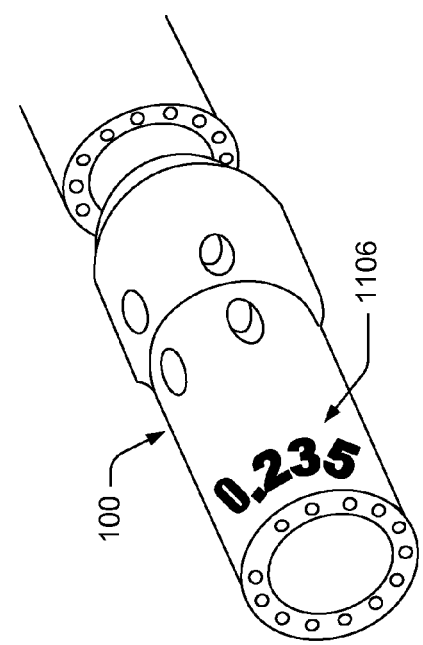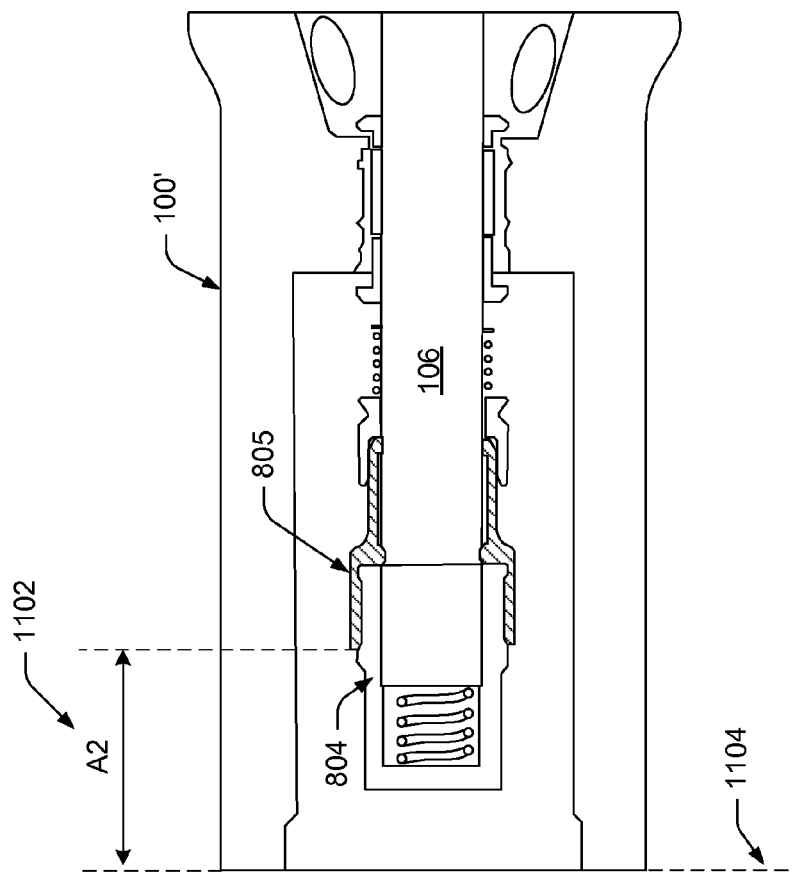
FIG. 11

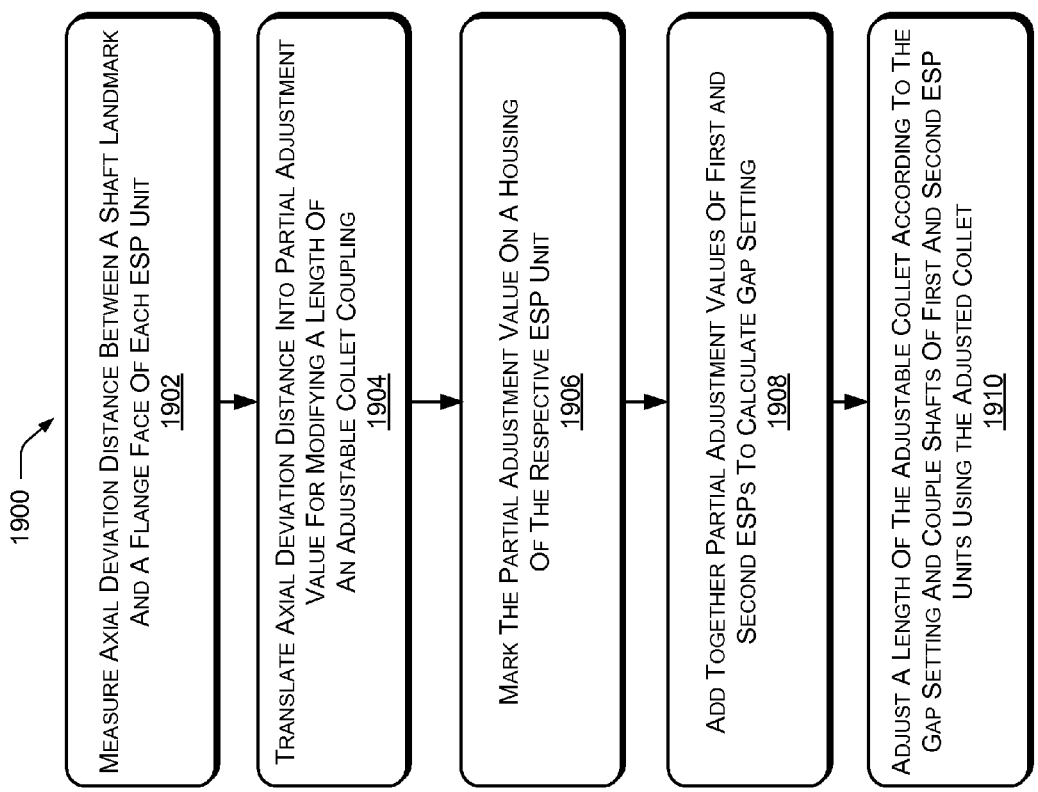

COLLET COUPLING FOR ELECTRIC SUBMERSIBLE PUMP SHAFTS

RELATED APPLICATIONS

This patent application claims the benefit of priority to U.S. Provisional Patent Application No. 61/757,904 filed on Jan. 29, 2013 and incorporated herein by reference in its entirety.

BACKGROUND

In the oil and gas industries, some inverted electric submersible pump (ESP) systems that have the pumps below the motor use a special connection between the shafts that can transmit not only the torque but also the axial load. This axial load can arise from the thrust within the pumps, weight of the shafts and impellers below, or pressure difference in the sections acting on shafts. The axial load should be transmitted to the axial bearings located in the protector.

Similar axial load can appear in some conventional ESPs in situations in which the pump is operated for upthrust and this is transmitted to the protector by torque locking in the coupling.

Conventionally, connection of the shafts in inverted ESPs is mostly performed with the special "pinned" couplings that can be fixed to the shaft with a pin installed in a hole through the shaft and coupling. The pin transmits the axial load from the shaft below to the coupling and the second pin transmits the axial load from the coupling to the shaft above. Installation and removal of these pins has been difficult in the field, and in some cases they are impossible to remove.

SUMMARY

A collet coupling for electric submersible pumps is provided. An example apparatus includes a coupling for joining two rotatable shafts in an electric submersible pump (ESP) string, further including a hollow tubular member for receiving an end of each of the two rotatable shafts, at least one collet for fixing the coupling to at least one of the two rotatable shafts, expandable fingers on at least one end of the at least one collet for applying a radial force to the outside diameter of at least one of the two rotatable shafts, ribs on the fingers for latching into at least one groove on at least one of the two rotatable shafts, and shoulders on the at least one groove for transmitting and receiving axial load forces between the two rotatable shafts through the ribs, expandable fingers, and the at least one collet. An example method includes attaching one end of a coupling to a first rotatable shaft of a lower ESP unit in a well with a two-piece ring, adjusting an axial reach of a threaded collet of the coupling for attachment to a second rotatable shaft of an upper ESP unit being lowered onto the lower ESP unit, expanding collet fingers of the threaded collet by inserting the second rotatable shaft in the threaded collet, and engaging ribs of the expanding collet fingers in a groove of the second rotatable shaft to couple the first rotatable shaft and the second rotatable shaft and to transmit and receive axial loads between the first rotatable shaft and the second rotatable shaft through the threaded collet, the fingers, and the ribs. Another example method includes measuring an axial deviation distance between a shaft landmark and a flange face of a first electric submersible pump (ESP) unit, translating the axial deviation distance to a partial adjustment value for modifying a length of an adjustable collet coupling for joining a first shaft of the first ESP unit to a second shaft of a second ESP unit and transferring axial loads between the first shaft and the second shaft, and marking the partial adjustment value on a housing of the first ESP unit for future installation of the adjustable collet coupling.

This summary section is not intended to give a full description of the subject matter. A detailed description with example embodiments follows.

BRIEF DESCRIPTION OF THE DRAWINGS

FIG. 11 is a diagram of an example method of measuring the deviation of the shaft and marking the ESP Unit at the factory.

FIG. 19 is a flow chart of an example method 1900 of installing a collet coupling according to factory-determined adjustment values.

DETAILED DESCRIPTION

Overview

In an example coupling, a collet connects two rotating shafts and also transmits axial load between each shaft connected to the coupling. Use of such an example collet simplifies the process of connecting electric submersible pump (ESP) sections together, and reduces time outlay for workers. The example collet coupling also simplifies the process of disconnecting ESP sections.

The example collet coupling may be used with cable-deployed downhole systems and coil-deployed systems, for example. The subject matter described herein may be used with many other systems that transmit axial (tension) force or load between the shafts after connection, and which benefit from an ability to be connected and disconnected quickly.

Example Devices

Figure 1:
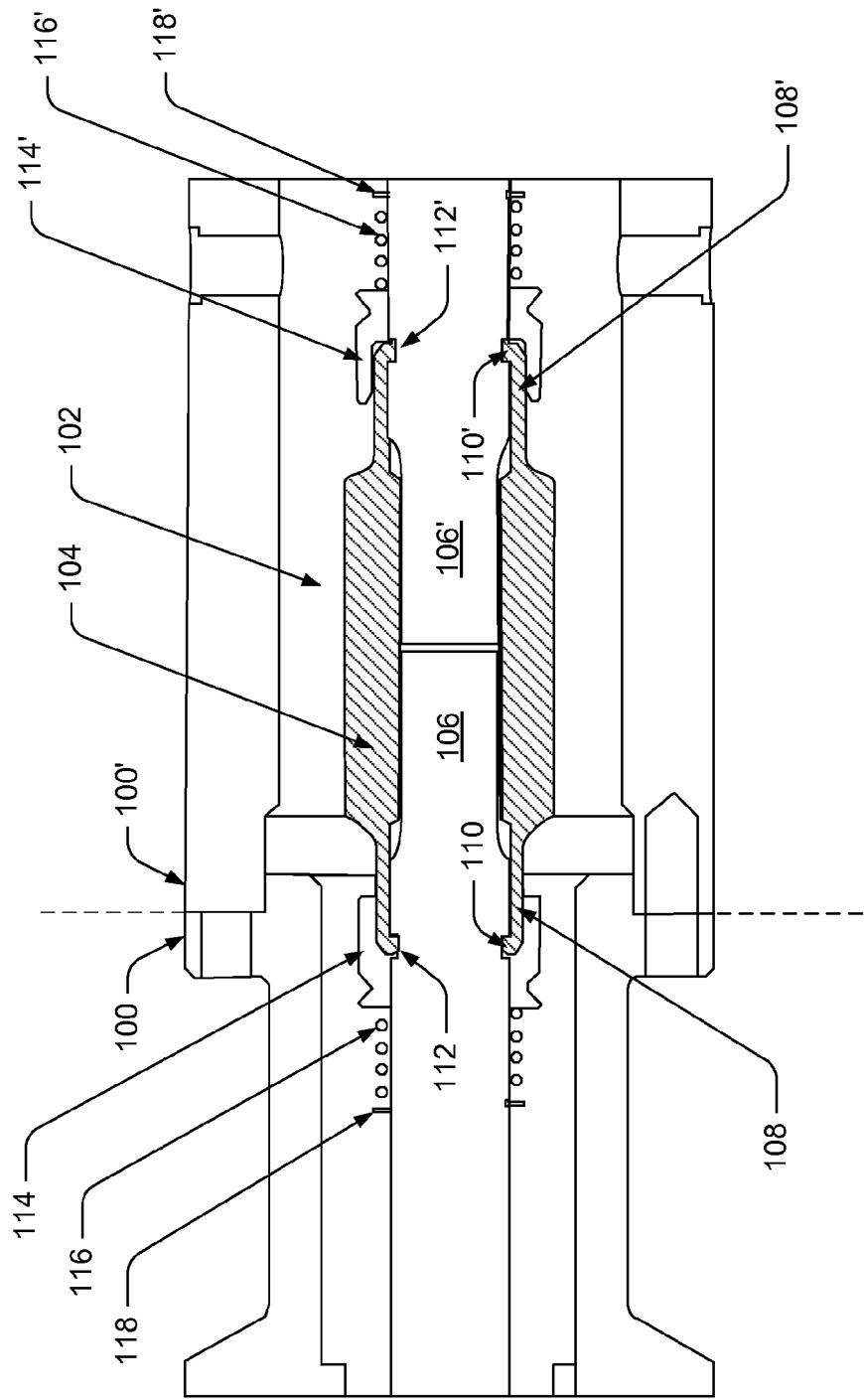
FIG. 1 is a diagram of an example connection of two ESP units via Collet Coupling.

FIG. 1 shows example connection between two ESP units 100 & 100' with an example collet coupling 102. The shaft 106 of the ESP unit 100 is connected to the shaft 106' of another ESP unit 100' via the example collet coupling 102. A collet 104 receives ends of both shafts 106 & 106' and extends a distance down each shaft to provide stability and strength for the connection. In an implementation, the connection to each shaft 106 & 106' is symmetrical for each shaft, but the description below details one side and one shaft, for clarity. Fingers 108 (& 108') of the example collet coupling 102 have ribs 110 that are locatable in a groove 112 on each shaft 106. A retainer 114 secures the grip of the collet 104 on the shaft 106 by keeping the fingers 108 from unclasping and consecutive finger ribs 110 from coming out of the shaft groove 112.

The retainer 114 can be kept in place over the collet fingers 108 by an elastic element 116 (e.g., a spring) resting on a snap ring 118, or by other means. For a symmetrical implementation, the second ESP unit 100' has the same connection with the example collet coupling 102 as the other side, the shaft 106' has a like groove 112' for the fingers 108' of the example collet 104, a retainer 114', elastic element 116' and snap ring 118'.

Figure 2:
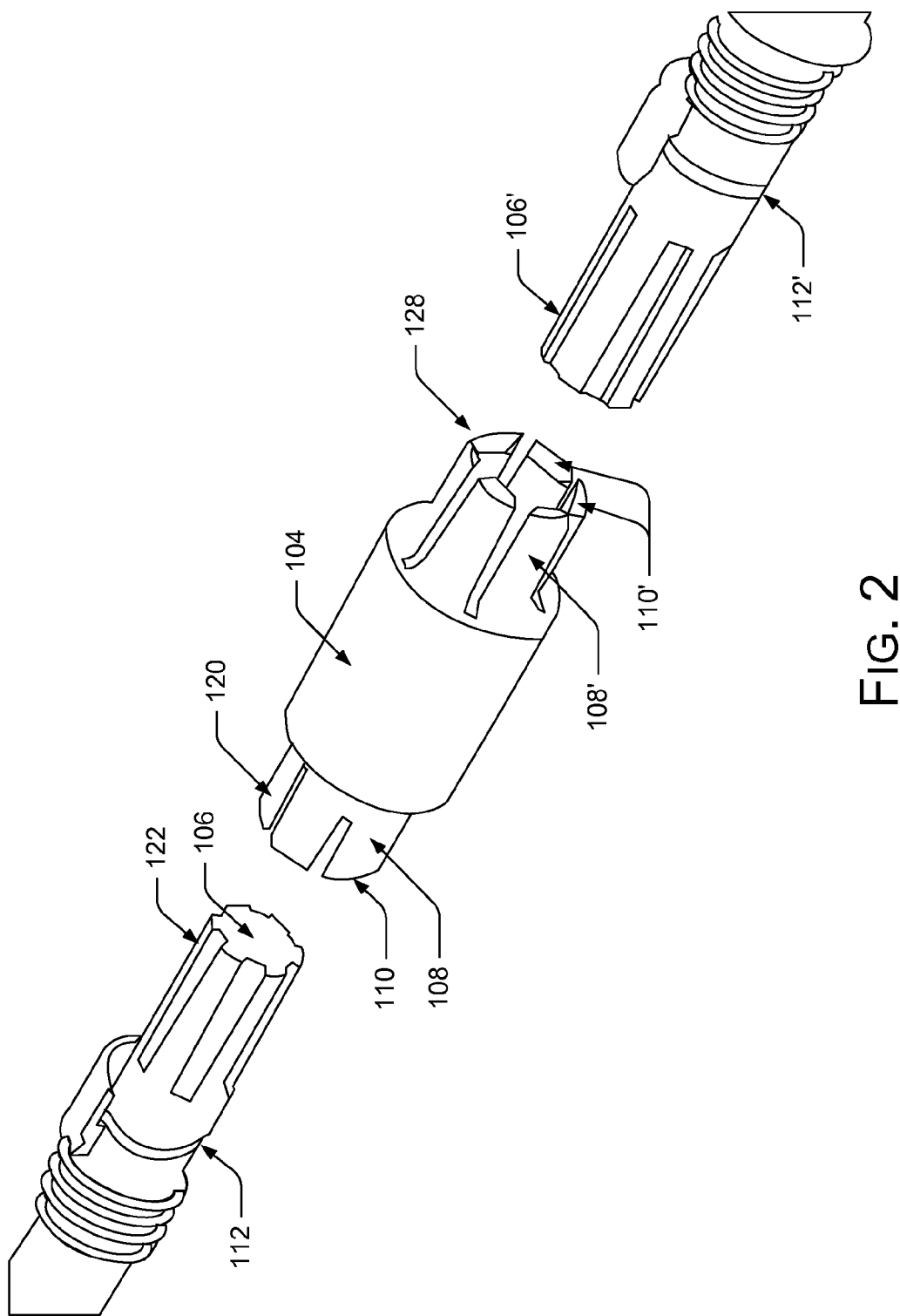
FIG. 2 is a diagram of an example shaft and collet coupling before being connected together.

FIG. 2 represents the shafts 106 & 106' and the example collet coupling 102 at a state before being connected together. In an implementation, to connect shaft 106 with the example collet coupling 102, these are moved toward each other in straight axial movement. The splines 120 of the collet 104 may be aligned with the splines 122 of the shaft 106.

Figure 3:
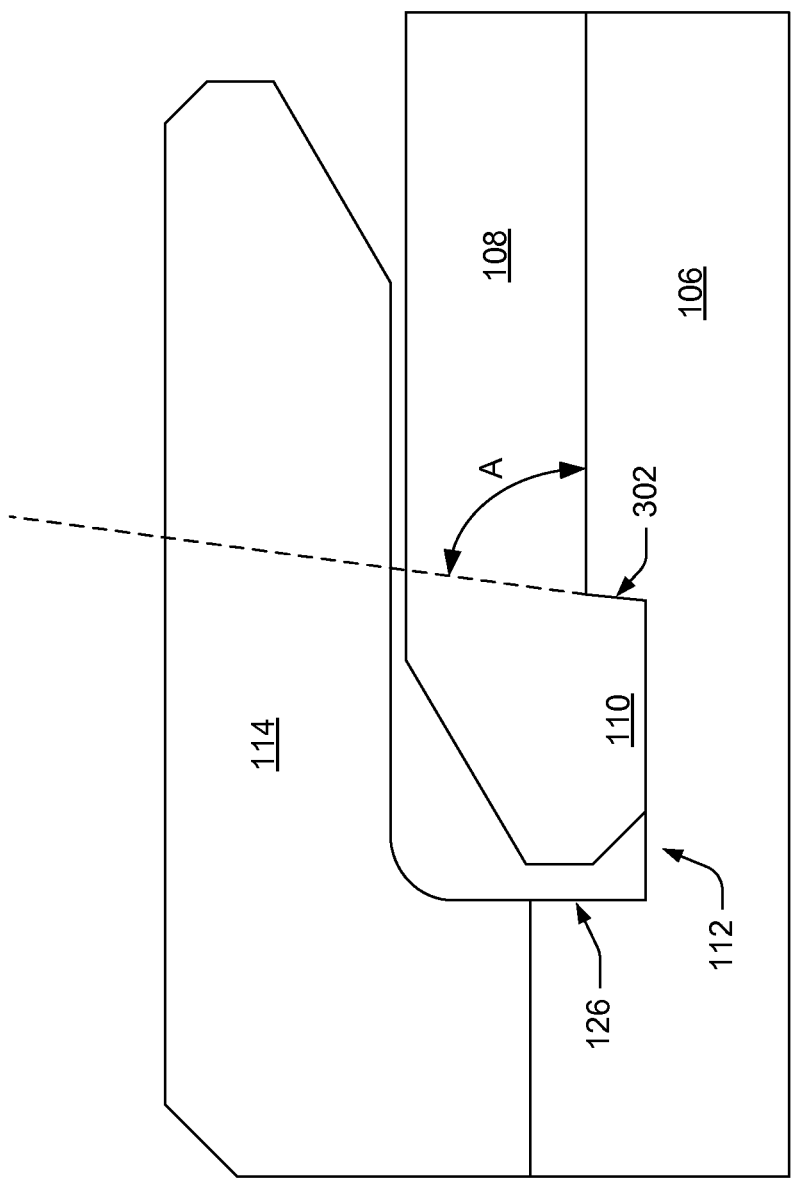
FIG. 3 is a diagram of an example of angle "A" of the rib and groove shoulder at less than 90°.

The fingers 108 of the collet 104 are initially in an undeflected position, but after they reach the shaft 106 the fingers 108 are elastically deflected radially outward from the central axis of the collet 104 until the inner diameter of the end of the fingers 108, defined by finger ribs 110, allows the shaft 106 to pass through. The ribs 110 at the end of the fingers 108 of the collet 104 can be visualized in FIG. 3. Referring to FIGS. 2-3, the outer diameter of the end of the collet 104, with deflected fingers 108, becomes larger in diameter than the inner diameter of the retainer 114, so that after the fingers 108 of the collet 104 reach the retainer 114, the fingers 108 push the retainer 114 down the shaft 106 away from the end of the shaft 106. Movement of the retainer 114 then compresses elastic element 116. As soon as the ribs 110 of the fingers 108 reach the groove 112 on the shaft 106, the resilience in the fingers 108 causes them to spring radially inward. The ribs 110 then catch the groove 112, and the now-reduced outer diameter of the fingers 108 releases the retainer 114 to slide over the fingers 108 toward the end of the shaft 106 under the force of compressed elastic element 116.

In an implementation, after sliding over the fingers 108 of the collet 104, the retainer 114 does not allow fingers 108 of the collet 104 to expand radially outward to release the ribs 110 from the groove 112 in the shaft 106. The ribs 110, now in place, transmit axial load to the shoulders 126 of the groove 112 they are residing in, while preventing significant axial movement between the collet coupling 102 and the shaft 106.

In an implementation, the other shaft 106' of the other ESP unit 100' on the other side of the collet coupling 102 can be connected to the collet 104 in the same manner as described above for shaft 106.

In an implementation, to disconnect the shaft 106 and the collet coupling 102, the retainer 114 is pushed back away from the fingers 108 of the collet 104, away from the end of the respective shaft 106. Then the shaft 106 and collet coupling 102 are pulled away from each other. In an implementation, the angle "A" of the engagement between the rib 110 and the groove shoulder 302 is less than 90° with respect to the horizontal as shown in FIG. 3, so that pulling the shaft 106 away from the coupling 102 forces the ribs 110 to expand radially out of the groove 112, and deflecting the fingers 108 radially outward. This action releases the collet 104 from the groove 112 of the shaft 106, and then the collet coupling 102 is easily removed from the shaft 106.

In addition to or instead of an angle of the rib 110 and shoulder 302 being less than 90°, another example technique of ensuring release of the ribs 110 from the groove 112 is to bias the fingers 108 slightly. In an implementation, the finger tips 128 are permanently bent outward in a slight curve. Then, during connection, the fingers 108 are forced inward against the force of this bias by the conical bore of the retainer 114 so that the ribs 110 engage the groove 112. During disconnection, once the retainer 114 is retracted, the ends 128 of the fingers 108 spring back away from the shaft 106. This allows disengagement with a rib 110 and shoulder 126 angle of 90° or greater, which may enhance the tension capacity of the coupling 102 by eliminating the radially outward force component or even generating an inward force component.

Figure 4:
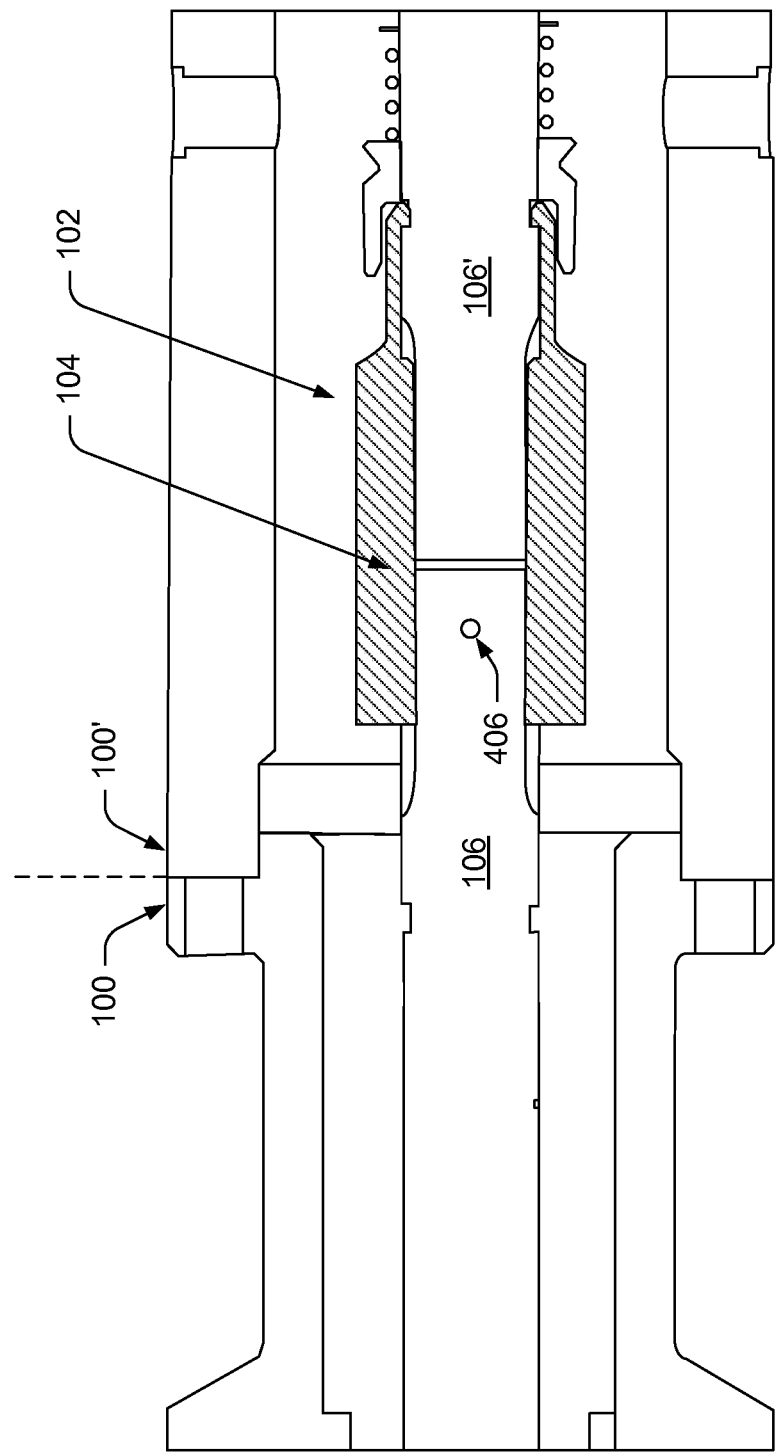
FIG. 4 is a diagram of an example of a collet coupling with example collet on one side and pinned to the shaft on the other side.

FIG. 4 shows an example implementation in which an example collet coupling 402 connects to the shaft 106' of one ESP unit 100' via an example collet 404, while the shaft 106 of another ESP unit 100 is connected to the same collet 404 using one of several conventional techniques: for example, the collet 404 may be pinned to the shaft 106 via a pin 406, or else threaded, welded, or fastened with a two-piece ring and nut, and so forth.

Figure 5:
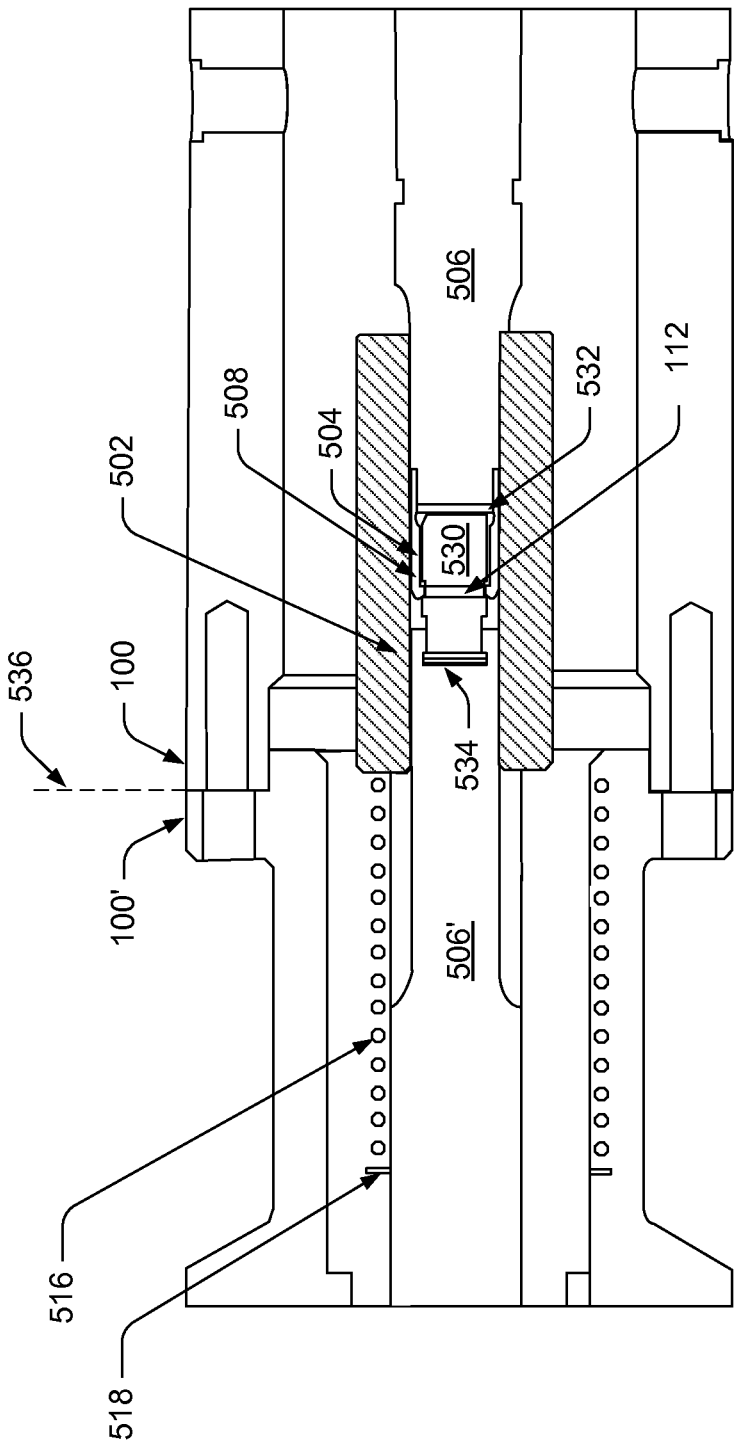
FIG. 5 is a diagram of an example connection with the coupling serving as a retainer for the collet at the end of the shaft.

FIG. 5 shows an implementation in which the coupling member 502 itself plays the role of retainer 514. In this design, the collet fingers 508 of a collet 504 can be attached to a shaft 506 as a separate part, or can be machined along with the shaft 506 in one piece. An insert 530 having a groove 112 can be attached to the other shaft 506' of the other ESP unit 100' as a separate part, or can be machined as part of the other shaft 506' in one piece. The coupling member 502, as a separate piece, can slide along the shaft 506' that is being connected, to allow the collet fingers 508 to engage the groove 112, and to act as a retainer when slid back to cover the outside diameter of the fingers 508, thereby keeping the fingers 508 from expanding out of the groove 112. To release the fingers 508 during disconnection, the coupling 502 is slid away from the collet fingers 508, down the other shaft 506' against the force of the elastic element 516 and the ring 518.

When the insert 530 with the groove 112 and the collet fingers 508 are made as separate parts with respect to their respective shafts 506 and 506', then their positions on the shaft 506 & 506' can be adjusted at the factory after completion of the ESP unit 100, e.g., with shims 532 and 534 to compensate for variations in positions of the ESP shafts 506 & 506', relative to the flange interface 536 between ESP units 100 & 100'. This can allow complete interchangeability of ESP units 100 in the field, eliminating the need to measure and adjust in the field.

Figure 6:
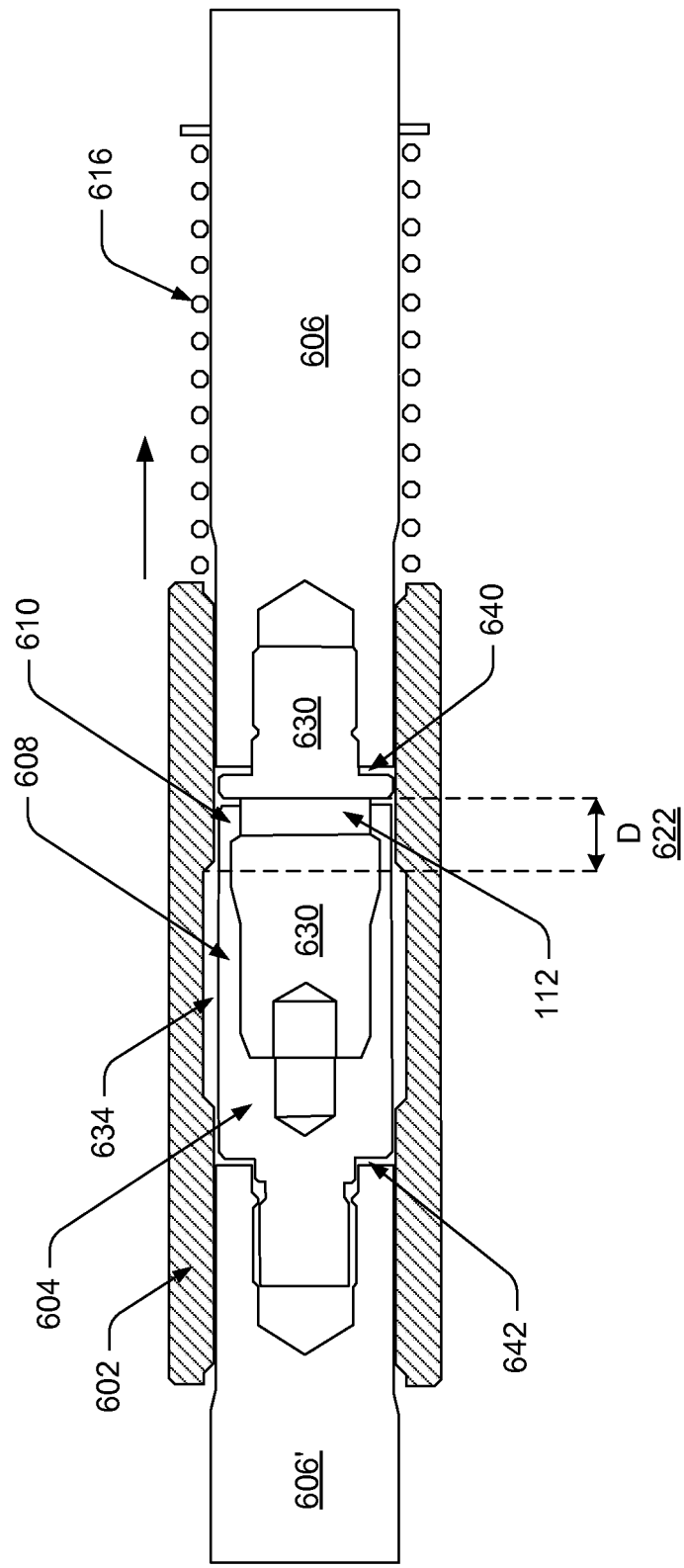
FIG. 6—Connection with the Notched Coupling serving as a Retainer for the Collet at the end of the Shaft. The notch in the coupling allows connect and disconnect shafts by sliding the Coupling over short distance.
Figure 17:
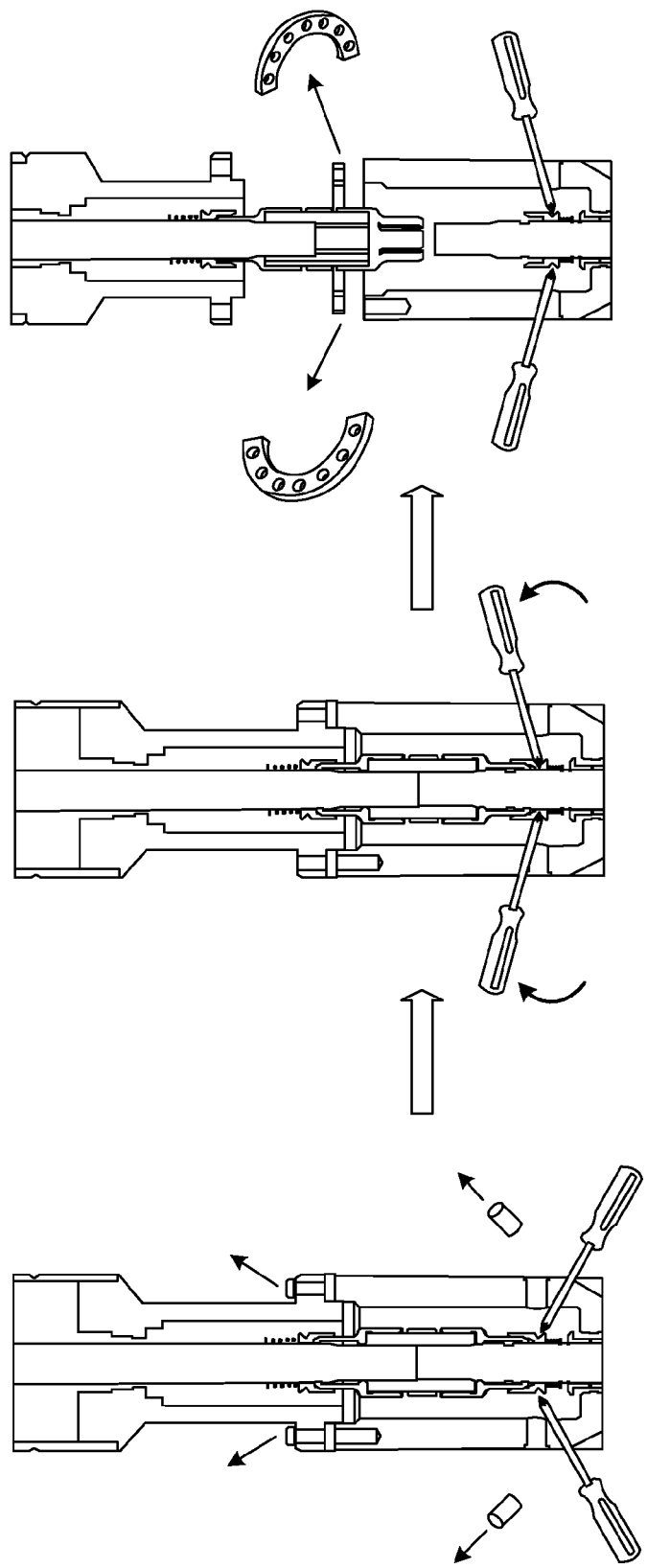
FIG. 17 is a diagram of example disconnection of the units during ESP retrieval.

FIG. 6 shows an example notched coupling 602 that reduces the distance the coupling 602 must slide down one shaft 606' in order to release the collet 604 from a groove 112, when disconnecting shafts. A notch 634 is machined on the inside diameter of the coupling 602. To release the connection, the notched coupling 602 slides, for example, to the right in FIG. 6, compressing the elastic element 616 (e.g., spring). When the notch 634 is over the relevant part of the collet 604, the collet fingers 608 and ribs 610 can expand and disengage from the groove 112. The distance the coupling 602 slides in order to disconnect can be very short: the disconnect distance 622 can be equal to the difference between the edge of the notch 634 and the end of the collet fingers 608. In order to release the connection the coupling 602 can be moved along the shaft 606 with screwdrivers or similar tools inserted through the openings, for example, as shown in FIG. 17.

Shims 640 & 642 can be used in the design of FIG. 6 with notched coupling 602 to adjust the position of the collet 604 with respect to the insert 630 and its groove 112, and inserted at the factory to compensate for the manufacturing inaccuracies and variations in the relative positions of the two shafts 606 & 606'.

Figure 7:
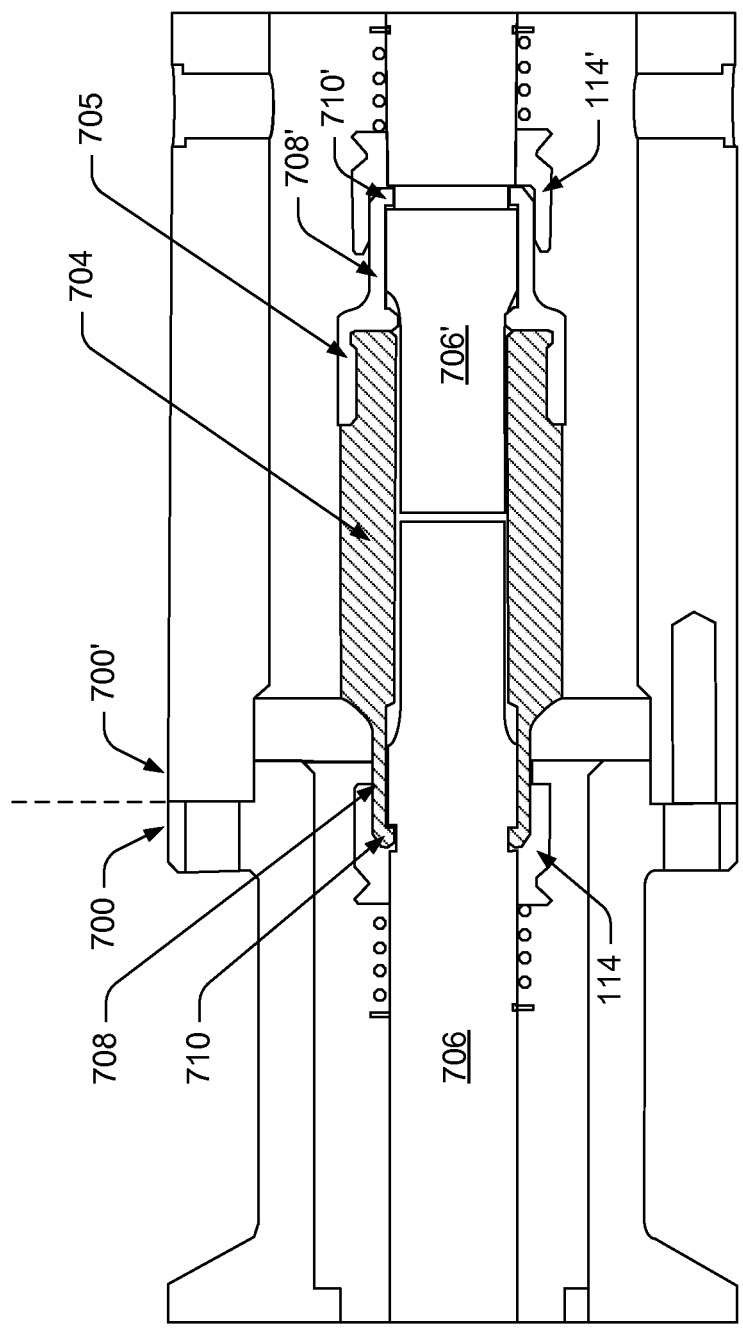
FIG. 7 is a diagram of an example connection with an adjustable collet coupling consisting of two parts.

FIG. 7 shows an example collet connection between the shafts 706 & 706' of two ESP units 700 & 700' using a two-piece adjustable collet 704 & 705. Due to occasional inaccuracy in the manufacturing of example ESP units 700 & 700', it can be useful to properly compensate for the distance between the shafts 606 & 606' for each of the two ESP units 700 & 700' to be connected together. Adjustment can be made by changing the placement, and specifically the distance between, the ribs 710 of collet piece 704 and the ribs 710' of collect piece 705. For this purpose the two-piece collet 704 & 705 is made of the two adjustable parts 704 & 705 that can be positioned and fixed relative to each other with good precision.

Figure 8:
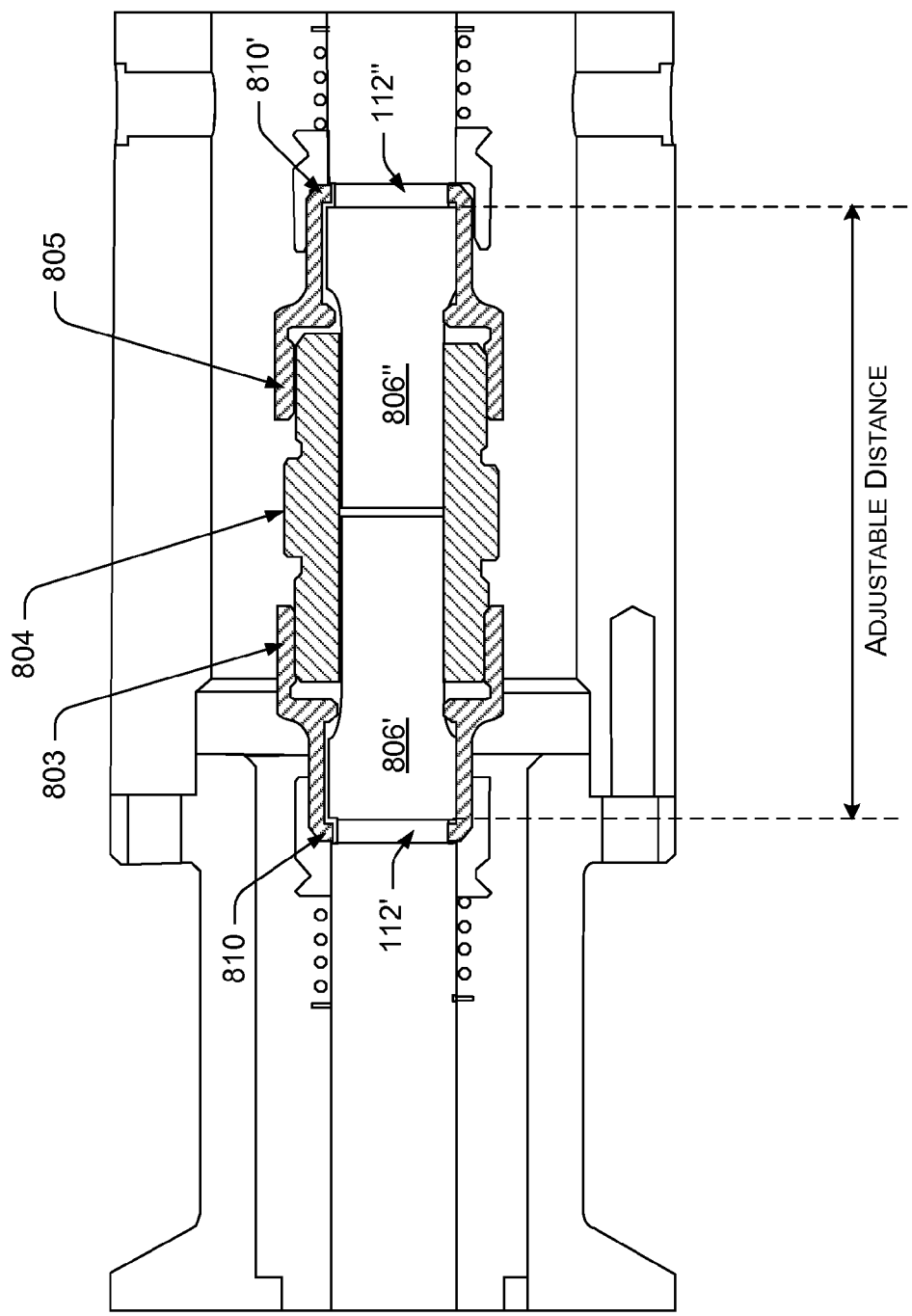
FIG. 8 is a diagram of an example connection with adjustable collet coupling consisting of three parts.

FIG. 8 shows example collet connection of two shafts 806 & 806', extending the adjustability shown in FIG. 7 to both shafts 806 & 806' by using a collet 804 consisting of three members 803 & 804 & 805. Adjustability of member 803, including ribs 810, with respect to main collet member 804 allows the ribs 810 to be adjustable to the location of groove 112' on shaft 806'. Likewise, adjustability of member 805, including ribs 810', with respect to main collet member 804 allows the ribs 810' to be adjustable to the location of groove 112' on shaft 806'.

Figure 9:
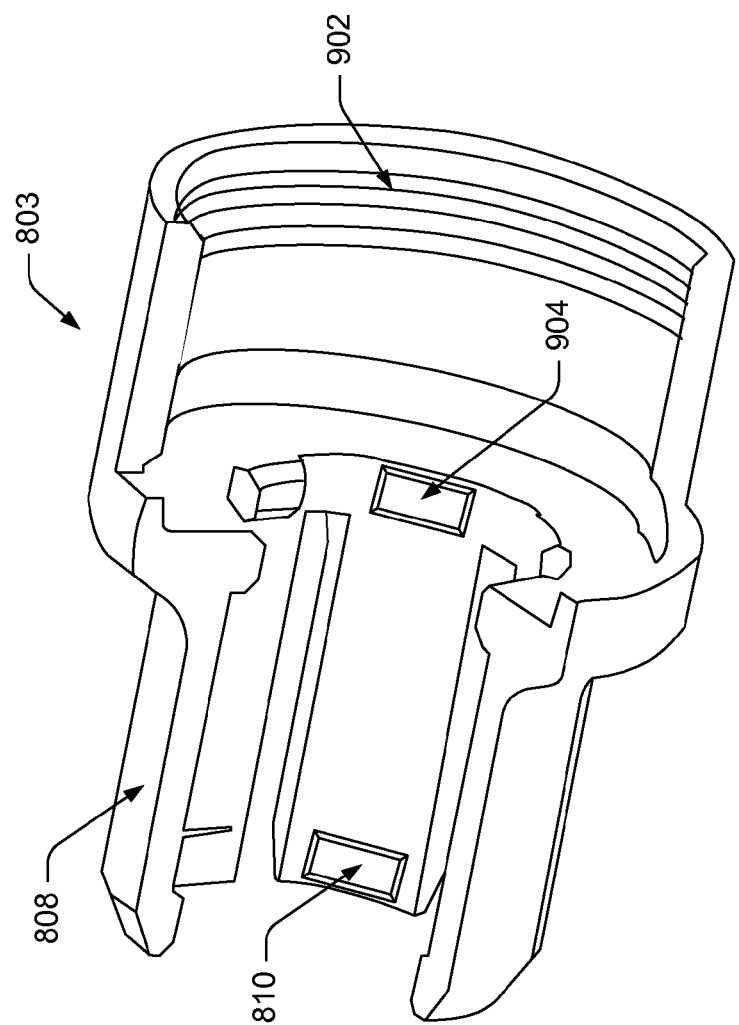
FIG. 9 is a diagram of example short splines on the collet used to prevent unscrewing the collet from the collet coupling.

FIG. 9 shows an example adjustable threaded collet member 803 with a threaded segment 902 that can be used to connect example collet members 803 and 804 together and render the connected collet members adjustable. The threaded collet member 803 has fingers 808 and ribs 810 to fit into groove 112 of shaft 1006 and can be used as adjustable collet member 803 (or 805) in FIG. 8. To prevent the threaded segment 902 from unscrewing after installation, example short splines 950 can be used.

Figure 10:
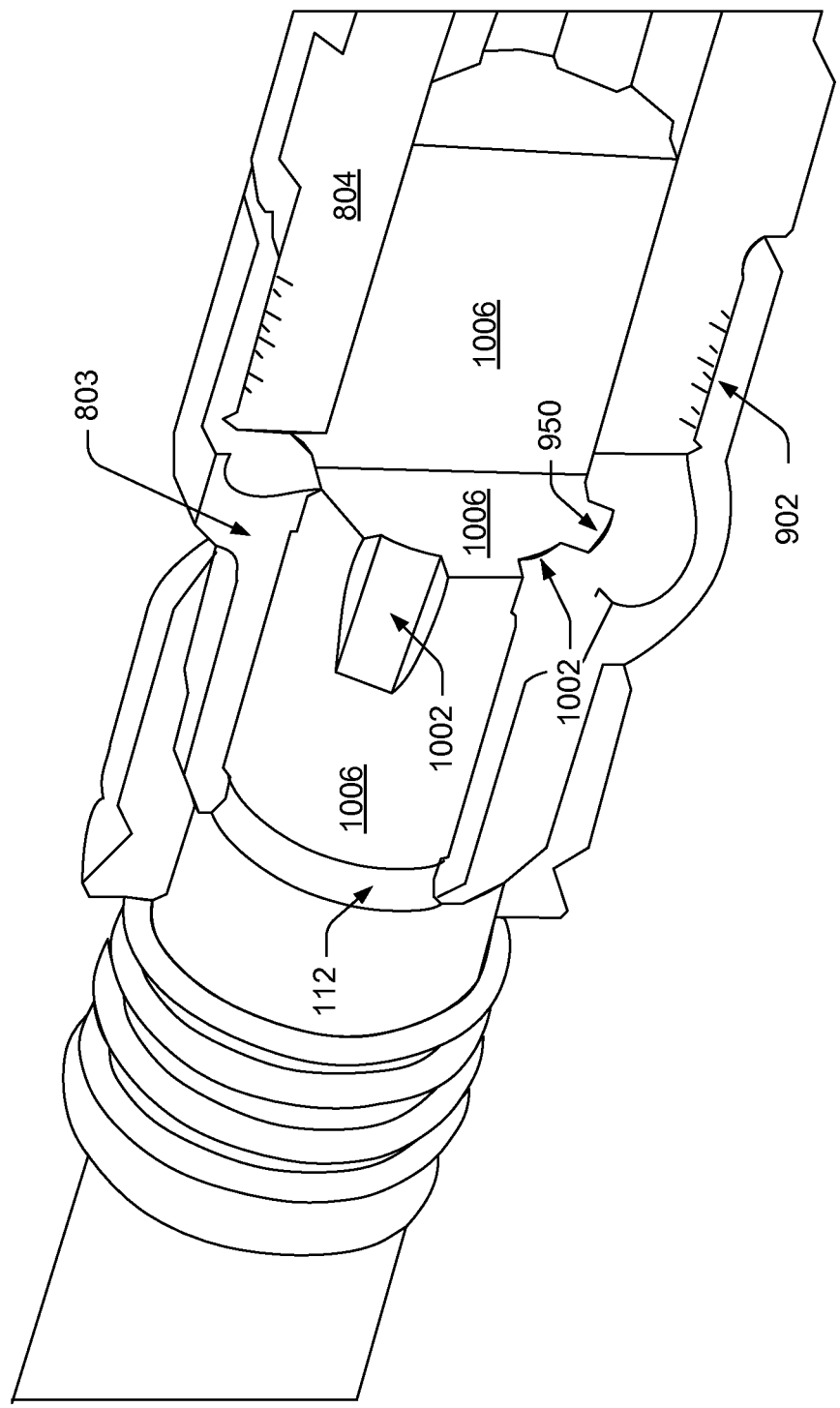
FIG. 10 is a diagram of an example section of a 3-part collet coupling connected to the shaft.

As shown in FIG. 10, the short splines 950 on the collet member 803 can be located in slots 1002 of the shaft 1006 and thereby prevent rotation of the collet member 803 and consequent unscrewing.

FIG. 11 shows an example technique of measuring a distance "A2" 1102 that provides on offset between a shaft or collet landmark and a common flange interface 1104 between two ESP units 100 & 100' to be joined, for purposes of adjusting a two-piece collet 704 & 705 or a three-piece collet 803 & 804 & 805 for good fit and good placement on the actual shafts 106 & 106' at hand. In an implementation, using the three-piece collet 803 & 804 & 805 as an example, the measured distance "A2" 1102 may represent deviation along an axial direction of a part of the collet member 803 from the flange interface 1104. This measurement, made for each ESP unit 100 & 100', enables knowledge of where the collet members 803 & 805 should be placed, and ultimately where the collet ribs 810 & 810' need to be in order to engage respective grooves 112 & 112' in respective shafts 106 & 106'. For ease of administration, the deviation measurement, e.g., "A2," 1102 may be incorporated into a summary axial deviation value "D1" 1106 that takes into account one or more nominal offsets or landmarks, such as actual shaft positions, various collet sizes, and initial configuration of collet members 803 & 804 & 805 with respect to each other.

Each deviation value, e.g., "D1" 1106 can be marked or stamped on the housing of the respective ESP unit 100. The stamped deviation value 1106 is used to adjust a side of the adjustable collet members 803 & 804 when installing the collet members 803 & 804 in the field, or the deviation values of two ESP units 100 & 100' can be combined to determine a total gap needed between collet members 803 & 805, that both screw onto middle collet member 804.

Figure 12:
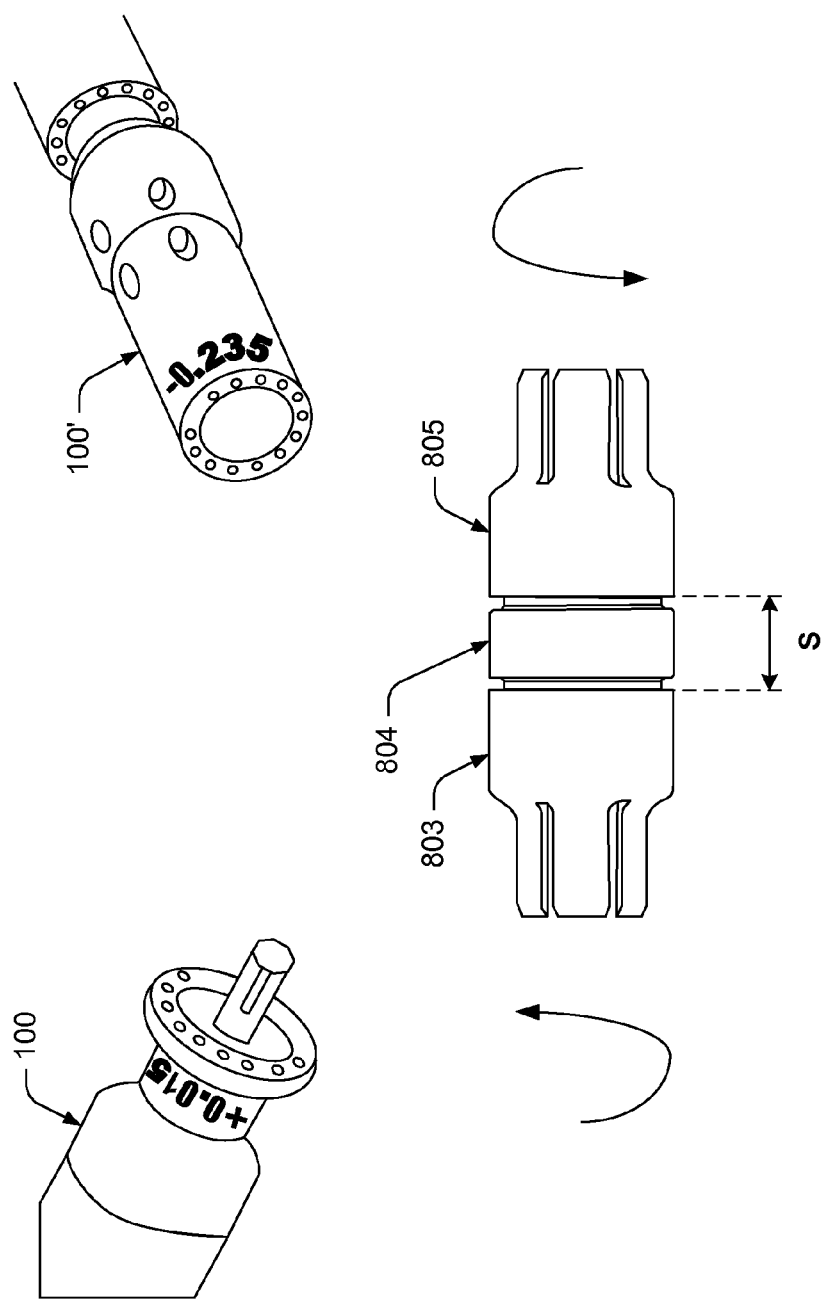
FIG. 12 is a diagram of an example method of adjusting the coupling per marked deviations at the field location.

FIG. 12 shows an example method of using the information marked in FIG. 11, for adjusting the example threaded collet coupling(s) 803 & 805 to compensate for the axial shaft deviations and correctly place the collet coupling. In an implementation, a field operator reads the deviation distance 1106 marked on each ESP unit 100 & 100' to be connected together. For example, example ESP unit 100 may have deviation distance D1=Nominal(1)−A1=+0.015 inches. Example ESP unit 100' may have deviation distance D2=A2−Nominal(2)+−0.235 inches. The field operator may read the two deviations, D1 and D2, from the outer housings of the two ESP units 100 & 100', add these together, and add a nominal coupling gap "G". So the distance to set the two collet members 803 & 805 apart on the middle collet member 804 is S=G+D1+D2, for example. Or, S=G+(+0.015)+(−0.235). In this example, "S" is the distance between edges of the threaded segments 902 of the respective collet members 803 & 805. The field operator turns each threaded collet member 803 & 805 with respect to the middle collet member 804 to set the distance between the collet members 803 & 805.

Figure 13:
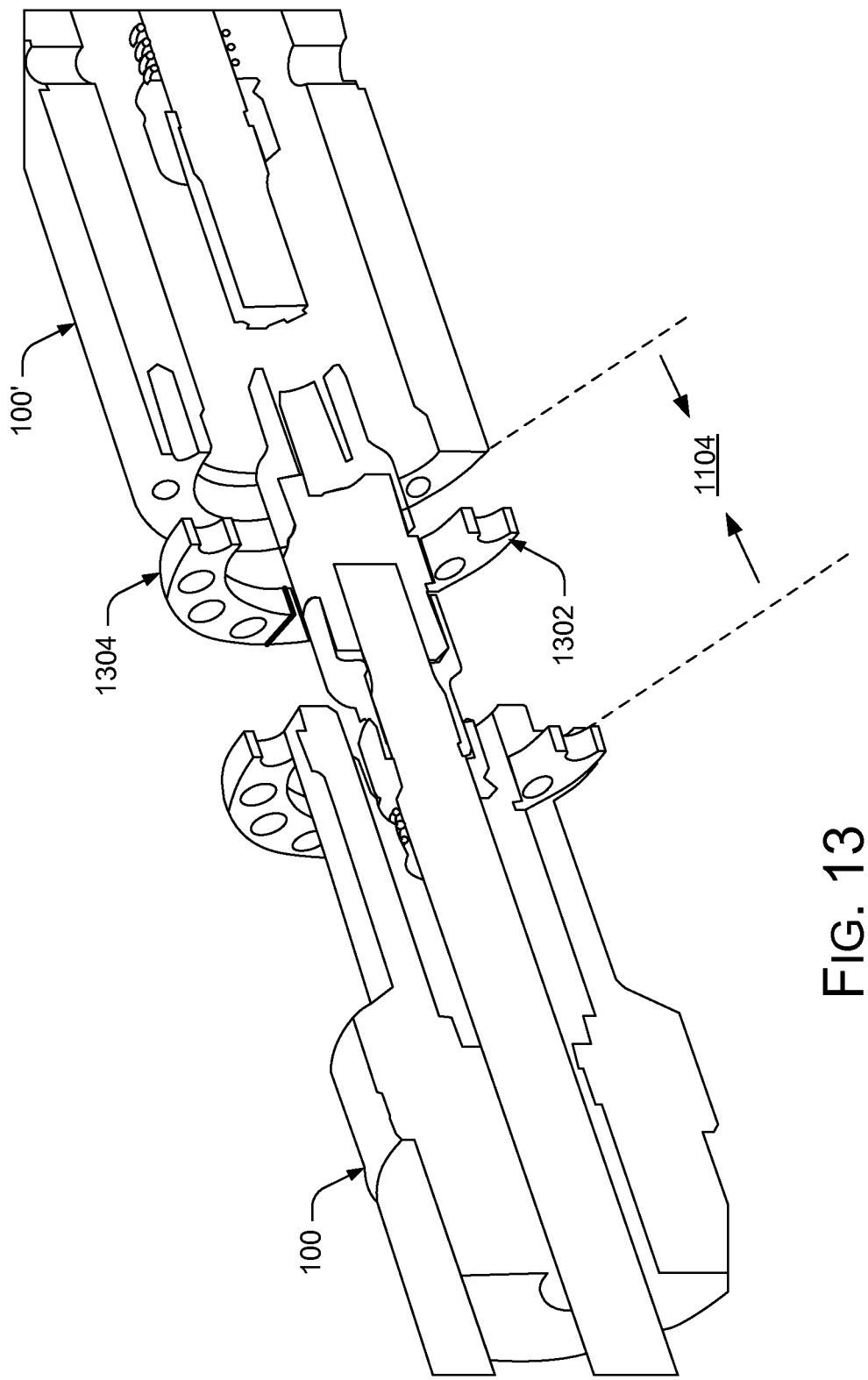
FIG. 13 is a diagram of an example of a two-piece shim between the ESP Units to compensate enlarged shaft extension.

FIG. 13 shows example an example shim set for the ESP flange face 1104, including shim 1302 and shim 1304 to compensate for variations in the ESP shaft position relative to the flange face 1104. The shim set 1302 & 1304 can also allow connection of ESP units 100 & 100' when both shafts extend beyond their respective housings. The two-piece set of factory shims 1302 & 1304 may permit complete interchangeability of ESP units 100' in the field. The example shimming can eliminate a need to measure and adjust the distance between the collet members 803 & 805 in the field. Installation in the field is subject to less control than in the factory and consumes valuable rig time.

An example shim set 1302 & 1304 also provides a preferred embodiment, that also comprises a coupling (e.g., 704 in FIG. 7, but with left-side of the collet pre-attached to shaft 706) that is pre-attached in the factory to the lower shaft 106 by a two-piece ring and nut combination, and a collet (e.g. 705) that is threaded in the field to the coupling of the upper shaft (similar to the right-hand collet member 705 in FIG. 7).

Example Construction Process

At the factory, an example manufacturing process starts by permanently attaching a body member of the coupling to a lower shaft of an ESP unit using a two-piece ring and nut. At the time of this attachment, the example process continues by inserting shims in this assembly to accurately regulate the position of the coupling with respect to the flange face of the ESP unit. A preferred location for such shims is between the inner end of the coupling and the two-piece ring.

Also at the factory, the ribbed end of the collet can be temporarily attached to the upper shaft to be connected. Then, the example process may include permanently inserting shims in the collet to accurately regulate the position of the collet with respect to the flange face.

A preferred location for such upper unit shims is in the bottom of the threaded socket that would otherwise contact the end of the coupling. If any thinner shims are desired they may be preferably held in place by a final, thick shim having threads that engage the threads in the coupling, completing the shim stack.

In the field, the lower unit may be positioned in the wellhead. In an implementation, a technique includes pushing back the retainer on the shaft of the upper unit and removing the collet. Then, the collet is threaded onto the coupling in the lower unit until the coupling contacts the shims. Then assembling the upper ESP unit to the lower ESP unit 100 may be performed as described herein.

This example process may be varied, including the sequence of operations, method of attaching the coupling to the lower shaft, reversal of the orientation of the assembly relative to the upper and lower shaft, use of shimmed collets on both shafts, contact of the coupling at an outer shoulder rather than the end, positioning of the shims in the assembly, retention of the shims by other means such as other threads, adhesives, magnetism, interference fit, or elasticity, and so forth.

During an example process of connecting two ESP units 100 & 100' together, it may be difficult to move the shafts 106 & 106' close enough to each other enough for the ribs 110 & 110' of the collet fingers 108 & 108' to get into the respective shaft grooves 112 & 112'. The shaft play can be rather large so that the flanges, e.g., 1104, of the ESP units 100 & 100' come into contact before the shafts 106 & 106' are close enough together to apply the collet 104. To overcome this problem, extension of the shafts 106 & 106' out of the ESP units 100 & 100' can be increased. To compensate for the increased shaft extension, the two-piece shim set 1302 & 1304 can be used for the installation as shown in FIG. 13.

Alternatively, to ensure that the ribs 110 reach the groove 112 in the shaft 106, the shaft 106 of one or both ESP units 100 can be pushed to (or near) their full extension by a fixture that can be installed. The fixture may be incorporated into a shipping cap. Or the fixture may be incorporated into a head to ease access while the ESP unit is half lowered into the well during installation process. When the fixture is removed after connection of the collet coupling 102 or 803 & 804 & 805, the shafts 106 & 106' are then free to move together over their full end play.

Figure 14:
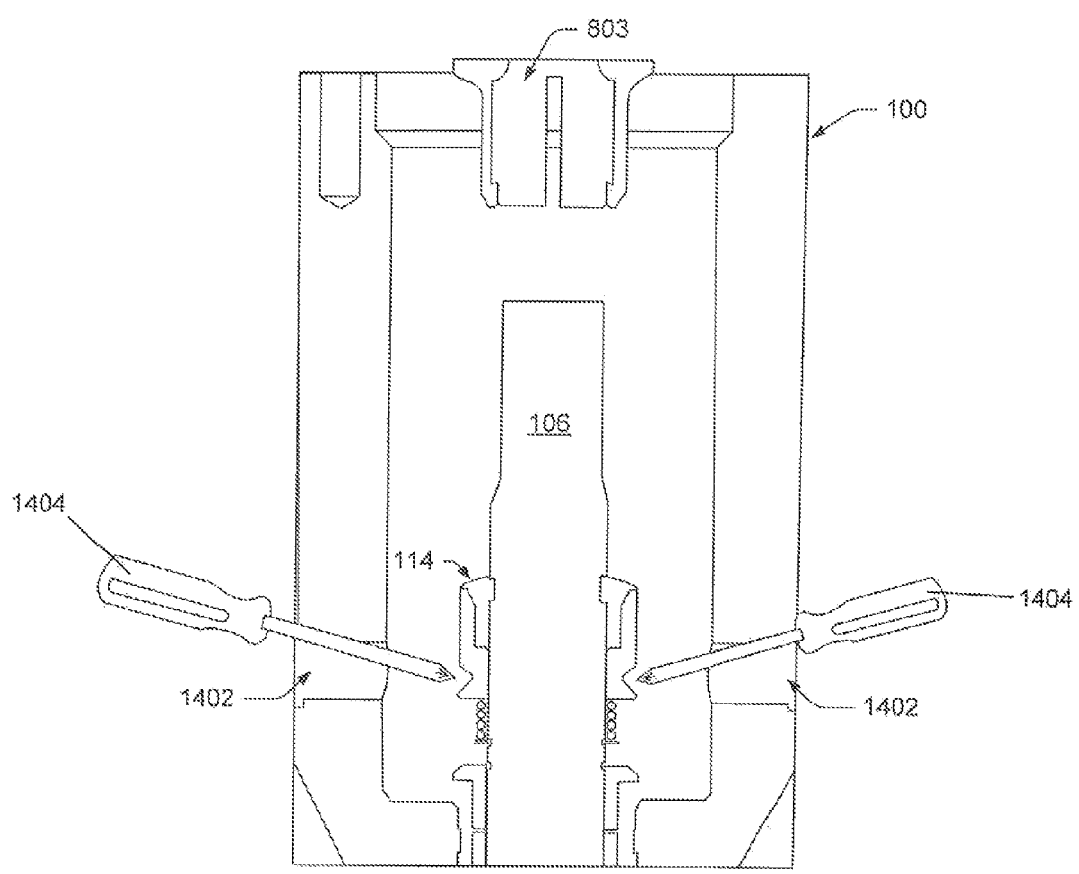
FIG. 14 is a diagram of an example technique of releasing the collet fingers by moving retainer away from the collet.

FIG. 14 shows example access to the retainer 114 for purposes of disconnecting shafts 106 & 106' from the collet coupling 102. In order to disconnect a shaft 106, the retainer 114 is moved away from the collet 104 in order to release the fingers 108. Movement of the retainer 114 can be initiated with example tools reaching the retainer 114 through special holes 1402 in the ESP unit 100 as shown in FIG. 14. The holes 1402 may be plugged during normal operation of the ESP 100. To ease the operation of moving the retainer 114, a special gripping slot or groove can be machined onto the retainer 114.

Because the retainer 114 may be stuck due to scale, corrosion, or wear, considerable force may be required to shift the retainer 114. To maintain engagement of an example shifting tool with the retainer 114 and to protect the special holes 1402 from damage, the shifting tool may comprise a lever element and a fulcrum element that engage each other securely with a feature such as a trunion or pivot pin. The fulcrum is preferably a bushing that threads into the special access hole 1402 until the lever engages the retainer 114. The lever can then be moved with sufficient force without disengaging the retainer 114. Force may be applied to the lever manually or by hydraulic or electrical actuator or by a system of levers, cams, or gears.

Alternatively, the retainer 114 may be shifted by an example rotating cam tool rather than a pivoting lever. The cam is mounted on a shaft that rides in a bushing that is inserted into the special hole 1402 in the ESP unit 100, so that the cam engages the retainer 114. The shaft may also engage another stationary feature inside the ESP unit 100 to provide additional support and stability. When the shaft is rotated, the cam converts this to an axial force that shifts the retainer 114.

The example cam tool may also take the form of a tool having a tapered end that engages the retainer 114 and converts axial movement to axial force to shift the retainer 114. The axial force may be generated by screwing the example tool into the special hole 1402 or by pushing or hammering. As with the example cam tool, the shaft may engage a stationary feature inside the ESP unit 100 for support.

Alternatively, the retainer 114 may be shifted by an example non-pivoting, non-rotating rigid tool that is inserted in a special hole 1402 or that is preassembled inside the unit. This example tool retracts the retainer 114, allowing the collet fingers 108 to disengage when the two ESP units 100 & 100' are moved apart from each other.

Figure 15:
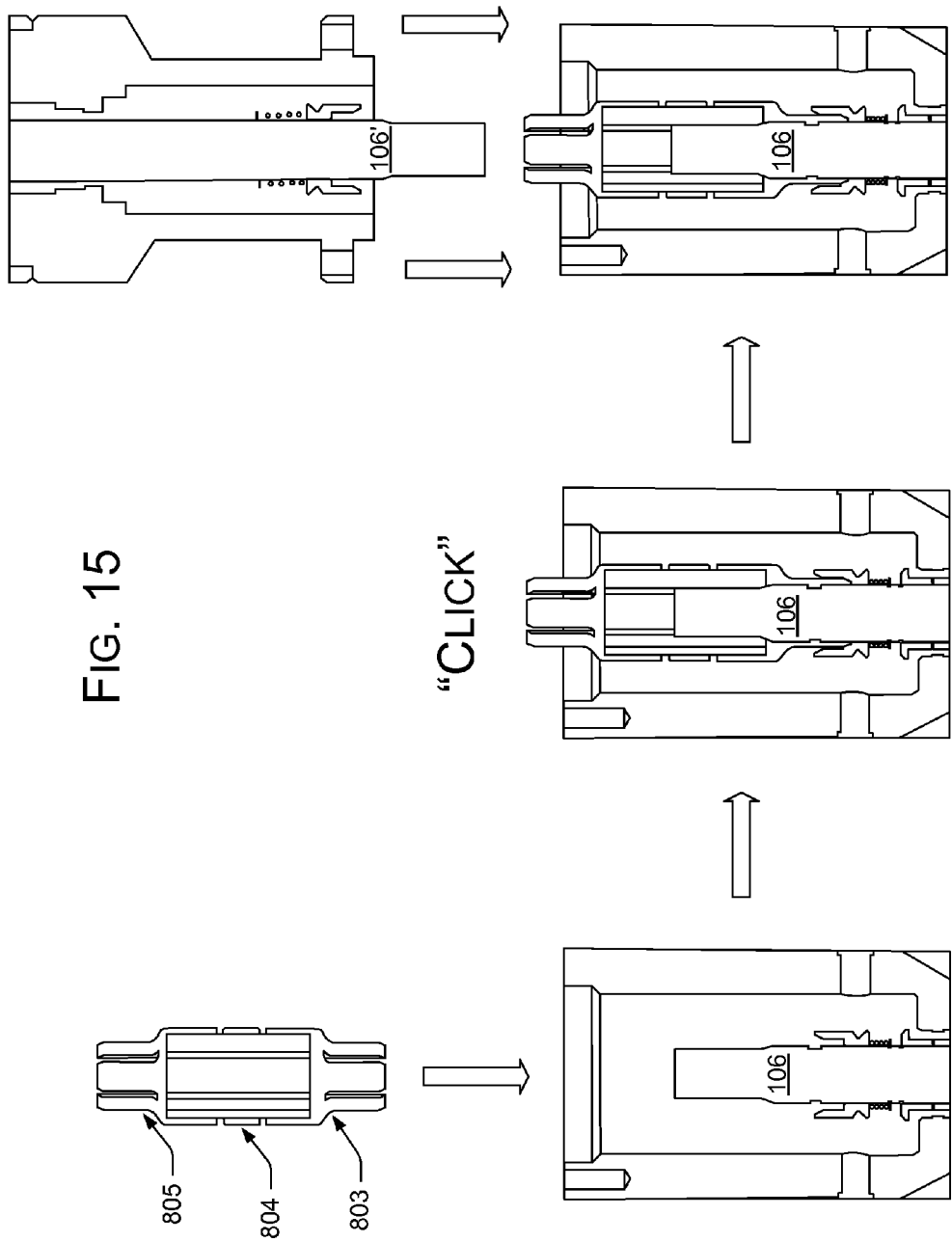
FIG. 15 is a diagram of an example connection of units during ESP installation.
Figure 16:
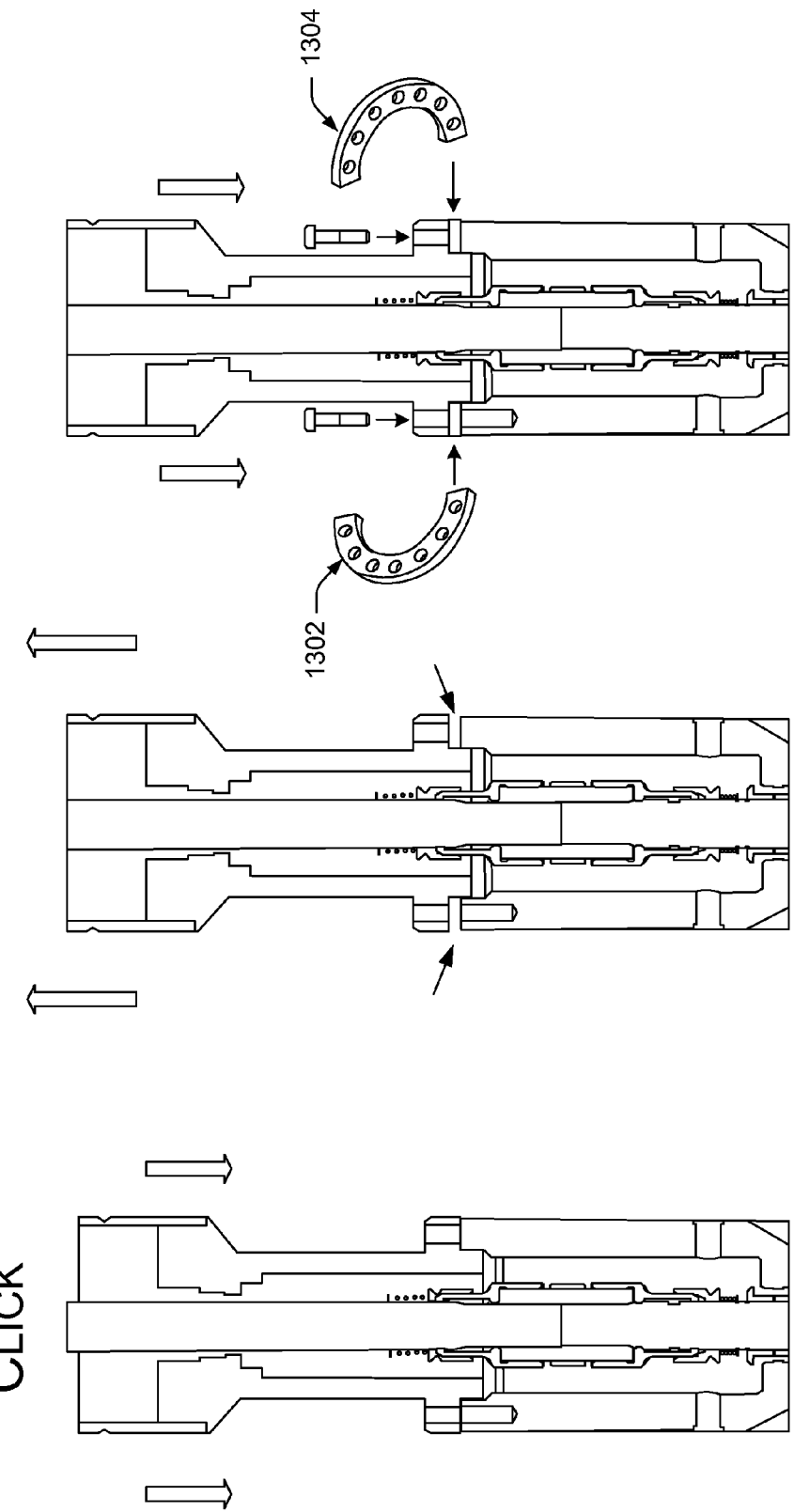
FIG. 16 is a diagram of an example connection of units during ESP installation (continued).

An example process of connection and disconnection of the shafts 106 & 106' of ESP units 100 & 100' during ESP installation and retrieval is shown in FIGS. 15, 16, and 17.

FIG. 17 shows example disconnection of ESP units during ESP retrieval. First, plugs are removed from holes 1402, and bolts holding the ESP units together are removed. Screwdrivers or other leverage tools 1404 are inserted in access holes 1402. The screwdrivers or tools release the collet by sliding the retainer 114. The upper ESP section is lifted, and shims 1302 & 1304 are removed.

Example Methods

Figure 18:
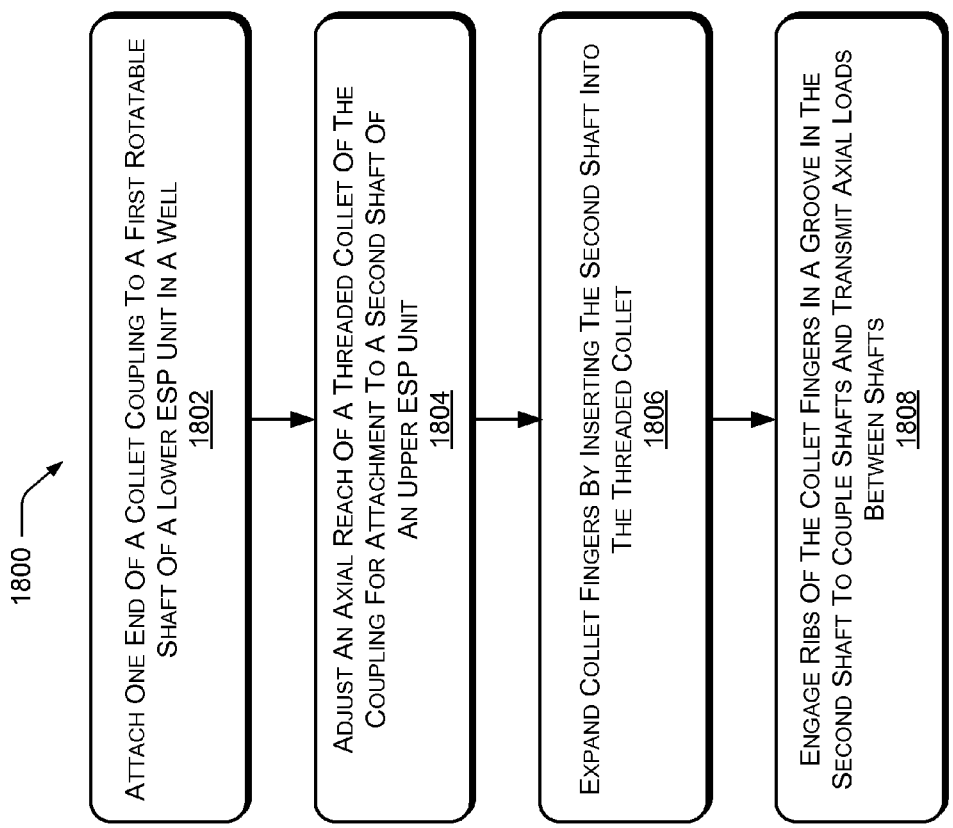
FIG. 18 is a flow chart of an example method 1800 of coupling shafts of two ESP units. In the flow diagram, the operations are summarized in individual blocks.

FIG. 18 shows an example method 1800 of coupling shafts of two ESP units. In the flow diagram, the operations are summarized in individual blocks.

At block 1802, one end of a coupling is attached to a first rotatable shaft of a lower ESP unit in a well with an attachment, such as a two-piece ring or ring and nut.

At block 1804, an axial reach of a threaded collet of the coupling is adjusted for attachment to a second rotatable shaft of an upper ESP unit being lowered onto the lower ESP unit.

At block 1806, collet fingers of the threaded collet are expanded by inserting the second rotatable shaft in the threaded collet.

At block 1808, ribs of the expanding collet fingers are engaged in a groove of the second rotatable shaft to couple the first rotatable shaft and the second rotatable shaft and to transmit and receive axial loads between the first rotatable shaft and the second rotatable shaft through the threaded collet, the fingers, and the ribs.

The example method 1800 may further comprise securing the fingers and the ribs in the groove of the second rotatable shaft via a sliding retainer, held in place by a biasing member. The example method 1800 may include disconnecting the second rotatable shaft from the threaded collet by sliding the retaining member against the biasing member to expand the fingers and release the ribs from the groove. The method 1800 may also include placing at least a flange shim between the lower ESP unit and the upper ESP unit to establish a fixed distance between the first rotatable shaft and the second rotatable shaft.

FIG. 19 shows an example method 1900 of installing a collet coupling according to factory-determined adjustment values. In the flow diagram, the operations are summarized in individual blocks.

At block 1902, an axial deviation distance is measured between a shaft landmark and a flange face of a first electric submersible pump (ESP) unit.

At block 1904, the axial deviation distance is translated to a partial adjustment value for modifying a length of an adjustable collet coupling for joining a first shaft of the first ESP unit to a second shaft of a second ESP unit and transferring axial loads between the first shaft and the second shaft.

At block 1906, the partial adjustment value is marked on a housing of the first ESP unit for future installation of the adjustable collet coupling.

At block 1908, the example method 1900 may also include adding a first partial adjustment value from the housing of the first ESP unit to a second partial adjustment value from a housing of a second ESP unit to calculate a gap setting for modifying the length of the adjustable collet coupling.

At block 1910, the example method 1900 may also include adjusting the length of the adjustable collet coupling according to the calculated gap value, and coupling the first shaft and the second shaft together using the adjusted collet coupling.

CONCLUSION

Although only a few example embodiments have been described in detail above, those skilled in the art will readily appreciate that many modifications are possible in the example embodiments without materially departing from the subject matter. Accordingly, all such modifications are intended to be included within the scope of this disclosure as defined in the following claims. In the claims, means-plus-function clauses are intended to cover the structures described herein as performing the recited function and not only structural equivalents, but also equivalent structures. It is the express intention of the applicant not to invoke 35 U.S.C. §114, paragraph 6 for any limitations of any of the claims herein, except for those in which the claim expressly uses the words 'means for' together with an associated function.

The invention claimed is:

1. An apparatus, comprising:
a coupling for joining two rotatable shafts in an electric submersible pump (ESP) string;
a hollow tubular member of the coupling for receiving an end of each of the two rotatable shafts;
at least one collet for fixing the coupling to at least one of the two rotatable shafts, wherein the at least one collet comprises a three-piece member, wherein a first collet member includes the hollow tubular member threaded at each end for adjustably receiving a second collet member on one end and a third collet member on the other end;
expandable fingers on at least one end of the second collet member and on at least one end of the third collet member for applying a radial force to an outside diameter of at least one of the two rotatable shafts wherein the second collet member and the third collet member are each adjustable with respect to the first collet member via the threaded ends of the first collet member;
ribs on the fingers for latching into at least one groove on at least one of the two rotatable shafts; and
shoulders on the at least one groove for transmitting and receiving axial load forces between the two rotatable shafts through the ribs, expandable fingers, and the at least one collet.

2. The apparatus of claim 1, further comprising a slidable retainer for securing the expandable fingers around one of the rotatable shafts to secure the ribs in the at least one groove.

3. The apparatus of claim 2, further comprising a biasing member to maintain the retainer over the expandable fingers; and
wherein as the retainer is moved against a biasing force of the biasing member, the expandable fingers expand and release the ribs from the at least one groove to disconnect the at least one collet from the rotatable shaft.

4. The apparatus of claim 2, further comprising a leverage tool for sliding the slidable retainer for disconnecting at least one rotatable shaft from the at least one collet.

5. The apparatus of claim 1, wherein the at least one collet includes a set of the fingers on each end of each collet as an integrated single piece.

6. The apparatus of claim 1, wherein the second collet member and the third collet member have short splines to engage slots on the two rotatable shafts to prevent the second collet member and the third collet member from unthreading from the first collet member.

7. The apparatus of claim 1, further comprising an insert attachable to one of the ends of one of the two rotatable shafts to provide the at least one groove.

8. The apparatus of claim 7, further comprising shims locatable on an axial end of the insert of the at least one collet to locate the insert and the at least one groove with respect to an end of one of the rotatable shafts.

9. The apparatus of claim 7, wherein the hollow tubular member slides on at least one of the two rotatable shafts over the insert to act as the slidable retainer for securing the fingers of the at least one collet.

10. The apparatus of claim 9, further comprising a notch located on an inside diameter surface of the hollow tubular member to allow a release of the fingers and the ribs as the hollow tubular member slides on the at least one rotatable shaft.

11. The apparatus of claim 1, further comprising at least one flange shim, to adjust a distance between electric submersible pump (ESP) units including respective shafts of each ESP unit.

12. A method, comprising:
attaching one end of a coupling to a first rotatable shaft of a lower ESP unit in a well;
adjusting an axial reach of a threaded collet of the coupling for attachment to a second rotatable shaft of an upper ESP unit being lowered onto the lower ESP unit;
expanding collet fingers of the threaded collet by inserting the second rotatable shaft in the threaded collet;
engaging ribs of the expanding collet fingers in a groove of the second rotatable shaft to couple the first rotatable shaft and the second rotatable shaft and to transmit and receive axial loads between the first rotatable shaft and the second rotatable shaft through the threaded collet, the fingers, and the ribs;
securing the fingers and the ribs in the groove of the second rotatable shaft via a sliding retainer, held in place by a biasing member; and
disconnecting the second rotatable shaft from the threaded collet by sliding the retaining member against the biasing member to expand the fingers and release the ribs from the groove.

13. The method of claim 12, further comprising placing at least a flange shim between the lower ESP unit and the upper ESP unit to establish a fixed distance between the first rotatable shaft and the second rotatable shaft.

14. A method, comprising:
measuring an axial deviation distance between a shaft landmark and a flange face of a first electric submersible pump (ESP) unit;
translating the axial deviation distance to a partial adjustment value for modifying a length of an adjustable collet coupling for joining a first shaft of the first ESP unit to a second shaft of a second ESP unit; and
marking the partial adjustment value on a housing of the first ESP unit for future installation of the adjustable collet coupling.

15. The method of claim 14, further comprising adding a first partial adjustment value from the housing of the first ESP unit to a second partial adjustment value from a housing of a second ESP unit to calculate a gap setting for modifying the length of the adjustable collet coupling;
adjusting the length of the adjustable collet coupling according to the calculated gap value; and
coupling the first shaft and the second shaft together using the adjusted collet coupling.

16. An apparatus, comprising:
a coupling for joining two rotatable shafts in an electric submersible pump (ESP) string;
a hollow tubular member of the coupling for receiving an end of each of the two rotatable shafts;
at least one collet for fixing the coupling to at least one of the two rotatable shafts, wherein the at least one collet comprises a two-piece member;
expandable fingers on at least one end of the at least one collet for applying a radial force to the outside diameter of at least one of the two rotatable shafts;
ribs on the fingers for latching into at least one groove on at least one of the two rotatable shafts; and
shoulders on the at least one groove for transmitting and receiving axial load forces between the two rotatable shafts through the ribs, expandable fingers, and the at least one collet, wherein a first collet member includes the hollow tubular member and fingers for gripping a first shaft integrated on one end of the hollow tubular member as a single piece, and the second collet member includes an adjustable threaded collet member including fingers for gripping a second shaft, the second collet member being adjustable with respect to the first collet member via a threaded section between the first and second collet members.

17. The apparatus of claim 16, further comprising a slidable retainer for securing the expandable fingers around one of the rotatable shafts to secure the ribs in the at least one groove.

18. The apparatus of claim 17, further comprising a biasing member to maintain the retainer over the expandable fingers; and
wherein as the retainer is moved against a biasing force of the biasing member, the expandable fingers expand and release the ribs from the at least one groove to disconnect the at least one collet from the rotatable shaft.

19. The apparatus of claim 17, further comprising a leverage tool for sliding the slidable retainer for disconnecting at least one rotatable shaft from the at least one collet.

20. The apparatus of claim 16, wherein the at least one collet includes a set of the fingers on each end of each collet as an integrated single piece.

21. The apparatus of claim 16, further comprising an insert attachable to one of the ends of one of the two rotatable shafts to provide the at least one groove.

22. The apparatus of claim 21, further comprising shims locatable on an axial end of the insert of the at least one collet to locate the insert and the at least one groove with respect to an end of one of the rotatable shafts.

23. The apparatus of claim 21, wherein the hollow tubular member slides on at least one of the two rotatable shafts over the insert to act as the slidable retainer for securing the fingers of the at least one collet.

24. The apparatus of claim 23, further comprising a notch located on an inside diameter surface of the hollow tubular member to allow a release of the fingers and the ribs as the hollow tubular member slides on the at least one rotatable shaft.

25. The apparatus of claim 16, further comprising at least one flange shim, to adjust a distance between electric submersible pump (ESP) units including respective shafts of each ESP unit.

* * * * *